United States Patent
Tuneld et al.

(10) Patent No.: US 10,325,139 B2
(45) Date of Patent: Jun. 18, 2019

(54) FINGERPRINT AUTHENTICATION WITH PARALLEL PROCESSING

(71) Applicant: Fingerprint Cards AB, Göteborg (SE)

(72) Inventors: Mats Tuneld, Lund (SE); Fredrik Ramberg, Göteborg (SE); Hans Thörnblom, Kungsbacka (SE)

(73) Assignee: FINGERPRINT CARDS AB, Göteborg (SE)

(*) Notice: Subject to any disclaimer, the term of this patent is extended or adjusted under 35 U.S.C. 154(b) by 128 days.

(21) Appl. No.: 15/456,803

(22) Filed: Mar. 13, 2017

(65) Prior Publication Data

US 2017/0330020 A1    Nov. 16, 2017

(30) Foreign Application Priority Data

May 13, 2016   (SE) ........................... 1650647

(51) Int. Cl.
*G06K 9/00*     (2006.01)
*G06K 9/03*     (2006.01)

(52) U.S. Cl.
CPC ..... *G06K 9/00087* (2013.01); *G06K 9/00993* (2013.01); *G06K 9/036* (2013.01)

(58) Field of Classification Search
CPC . G06K 9/00087; G06K 9/036; G06K 9/00993
See application file for complete search history.

(56) References Cited

U.S. PATENT DOCUMENTS

| | | |
|---|---|---|
| 2002/0021827 A1 | 2/2002 | Smith |
| 2003/0091724 A1 | 5/2003 | Mizoguchi |
| 2010/0080425 A1* | 4/2010 | Bebis ................ G06K 9/00073 382/125 |
| 2012/0283871 A1* | 11/2012 | Chai ...................... G06F 21/32 700/237 |
| 2013/0329967 A1 | 12/2013 | Abiko |
| 2014/0286545 A1 | 9/2014 | Yi et al. |

(Continued)

FOREIGN PATENT DOCUMENTS

| | | |
|---|---|---|
| CN | 102799869 A | 11/2012 |
| CN | 103782268 A | 5/2014 |

(Continued)

OTHER PUBLICATIONS

Swedish Search Report from Swedish Application No. 1650647-9, dated May 13, 2016.

*Primary Examiner* — Solomon G Bezuayehu
(74) *Attorney, Agent, or Firm* — RMCK Law Group, PLC

(57) ABSTRACT

The invention relates to a method of authenticating a user by means of a fingerprint authentication system comprising a fingerprint sensing arrangement and authentication circuitry. The method comprises the steps of acquiring a first candidate fingerprint image; acquiring a second candidate fingerprint image; processing, while acquiring the second candidate fingerprint image, the first candidate fingerprint image by the authentication circuitry; and evaluating a result of the processing. When the evaluation indicates that successful authentication is not likely based on the first candidate fingerprint image, the user is authenticated based on the second candidate fingerprint image.

11 Claims, 11 Drawing Sheets

(56) References Cited

U.S. PATENT DOCUMENTS

| | | | |
|---|---|---|---|
| 2015/0169934 A1* | 6/2015 | Tsai | G06K 9/00033 |
| | | | 382/115 |
| 2015/0347816 A1 | 12/2015 | Boshra | |
| 2015/0371073 A1* | 12/2015 | Cho | G06F 3/0488 |
| | | | 382/124 |
| 2016/0217313 A1* | 7/2016 | Cuti | G06F 3/0488 |
| 2017/0011252 A1* | 1/2017 | Yang | G06F 3/011 |
| 2017/0192482 A1* | 7/2017 | Merrell | G06F 1/325 |
| 2018/0046347 A1* | 2/2018 | Wang | G06F 3/0488 |

FOREIGN PATENT DOCUMENTS

| | | |
|---|---|---|
| CN | 105335707 A | 2/2016 |
| WO | WO 99/26187 | 5/1999 |
| WO | 2015171941 A1 | 11/2015 |

\* cited by examiner

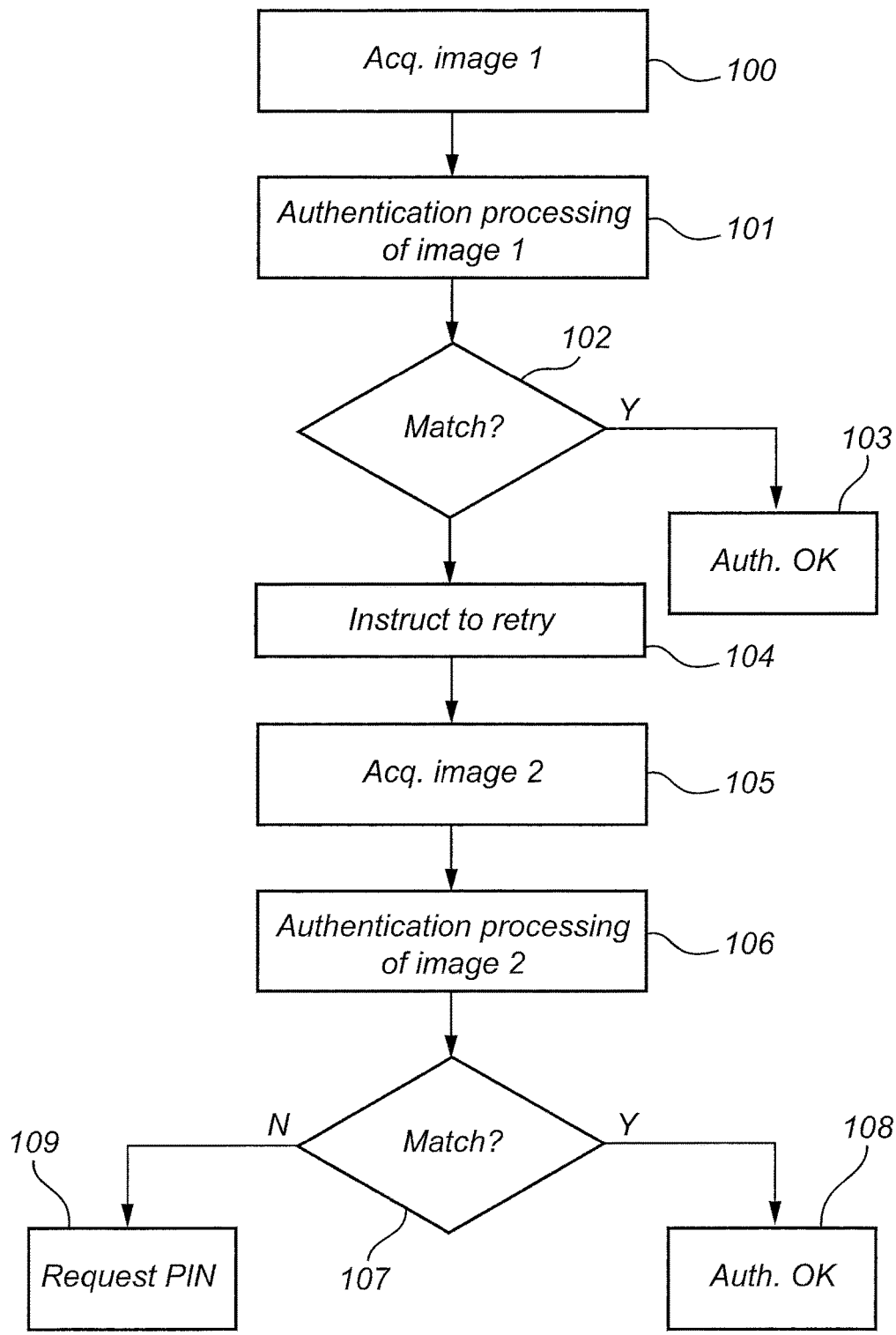
(Prior art) Fig. 3a

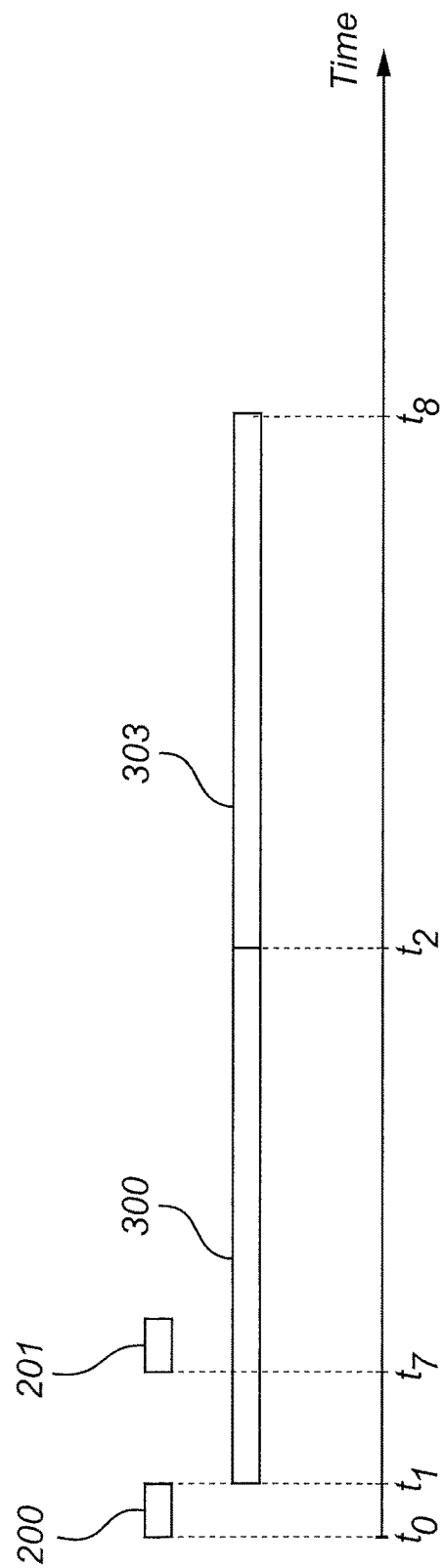

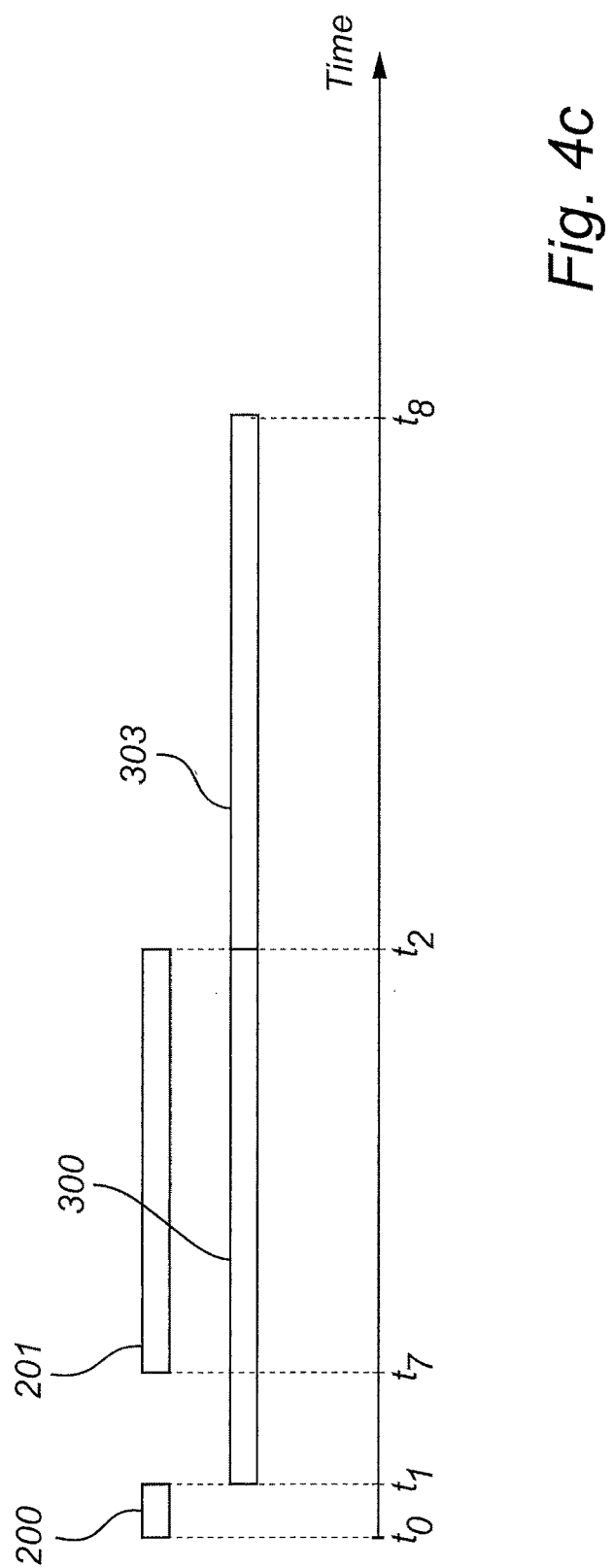

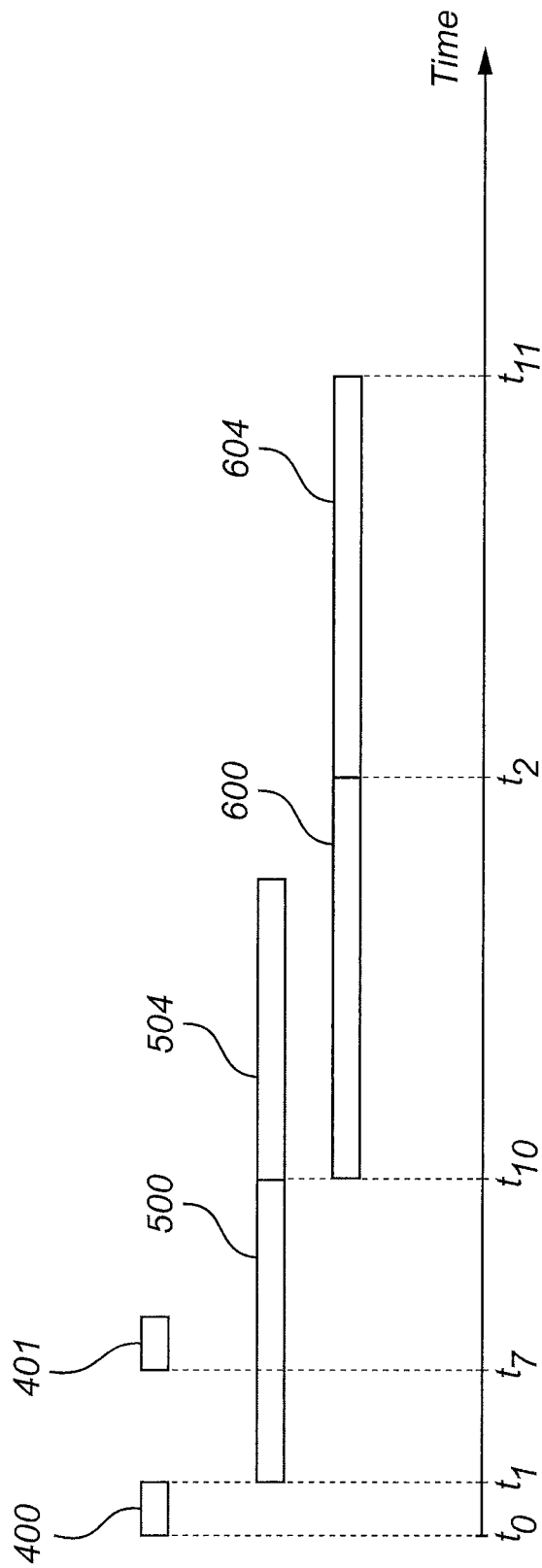

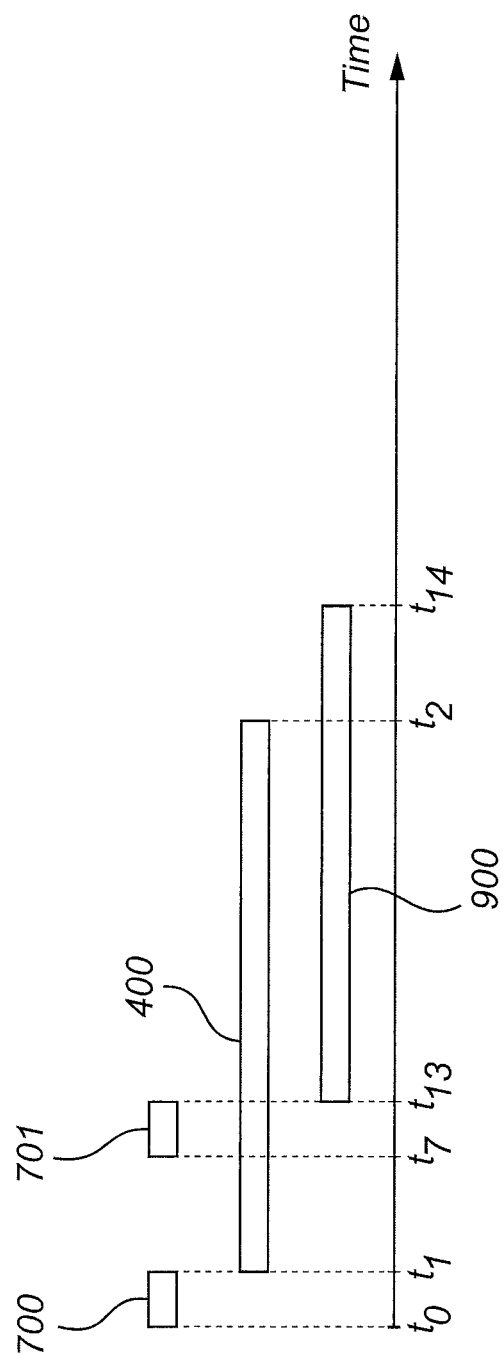

FINGERPRINT AUTHENTICATION WITH PARALLEL PROCESSING

CROSS-REFERENCE TO RELATED APPLICATION

The present application is based on and claims the benefit of Swedish patent application Serial No. 1650647-9, filed May 13, 2016, the content of which is hereby incorporated by reference in its entirety.

FIELD OF THE INVENTION

The present invention relates to a method of authenticating a user by means of a fingerprint authentication system, and to such a fingerprint authentication system.

BACKGROUND OF THE INVENTION

Various types of biometric systems are used more and more in order to provide for increased security and/or enhanced user convenience.

In particular, fingerprint authentication systems have been adopted in, for example, consumer electronic devices, thanks to their small form factor, high performance, and user acceptance.

With more widespread and diverse use of fingerprint authentication, the demands on speed and responsiveness are increasing. On the other hand, it is not expected that users will be willing to accept a reduced reliability as a consequence of a faster fingerprint authentication process.

It would be desirable to provide for more responsive fingerprint authentication without reducing the reliability of the fingerprint authentication.

SUMMARY

In view of the above, it is an object of the present invention to provide for improved fingerprint authentication, in particular to provide for more responsive fingerprint authentication without reducing the reliability of the fingerprint authentication.

According to a first aspect of the present invention, it is therefore provided a method of authenticating a user by means of a fingerprint authentication system comprising a fingerprint sensing arrangement and authentication circuitry, the method comprising the steps of: acquiring, by the fingerprint sensing arrangement, a first candidate fingerprint image; acquiring, by the fingerprint sensing arrangement, a second candidate fingerprint image; processing, while acquiring the second candidate fingerprint image, the first candidate fingerprint image by the authentication circuitry, the processing resulting in a processed representation of the first candidate fingerprint image; evaluating the processed representation of the first candidate fingerprint image in respect of at least a first evaluation criterion; and when the processed representation of the first candidate fingerprint image fails to fulfill the at least one evaluation criterion: authenticating the user based on the second candidate fingerprint image.

The first candidate fingerprint image and the second candidate fingerprint image may advantageously be acquired during the same finger placement event, when the finger is not moving across the sensor surface. In other words, the finger may be substantially stationary during the finger placement event. One or both of the first candidate fingerprint image and the second candidate fingerprint image may be the result of one read-out from the fingerprint sensing arrangement, or several read-outs from the fingerprint sensing arrangement. In the latter case, the candidate fingerprint image may be formed by combining the read-outs, for instance through averaging.

Furthermore, the first candidate fingerprint image and the second candidate fingerprint image may be acquired in sequence, so that the acquisition of the second candidate fingerprint image is started after the acquisition of the first candidate fingerprint image has ended.

The processing of the first candidate fingerprint image by the authentication circuitry may start any time after the acquisition of the first candidate fingerprint image has ended. In embodiments, the processing of the first candidate fingerprint image may start while the acquisition of the first candidate fingerprint image is still going on. In general, however, the total time required for the processing of the first candidate fingerprint image may be considerably longer than the total time required for the acquisition of the first candidate fingerprint image.

The first candidate fingerprint image may be evaluated in respect of one evaluation criterion or several evaluation criteria. The at least first evaluation criterion may be any criterion usable for determining if it is likely that the user can be authenticated using the candidate fingerprint image. Accordingly, the at least first evaluation criterion may include one or several criteria ranging from a relatively simple image quality metric to a complete authentication result. Furthermore, the at least first evaluation criterion may include one or several predetermined criteria and/or be indicative of at least one property of a previously acquired image.

It should be noted that a fingerprint authentication system may be comprised in a stand-alone electronic device, such as a mobile communication device, a watch or a smart card, or may be formed by interconnected devices, such as a computer and a fingerprint acquisition device connected to the computer.

The fingerprint sensing arrangement may, for example, be a capacitive fingerprint sensing arrangement, detecting a measure indicative of the capacitive coupling between each sensing element in an array of sensing elements and a finger surface touching the sensing arrangement surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, acoustic, optical, thermal or piezo-electric fingerprint sensing arrangements etc.

Furthermore, the fingerprint authentication system according to embodiments of the present invention may be embodied as a system of components, or in a single component, such as an integrated circuit.

Moreover, the steps of the methods according to various embodiments of the present invention need not necessarily be performed in any particular order unless a particular order of steps is explicitly or implicitly specified in the claims.

The present invention is based upon the realization that the user of the fingerprint authentication system can experience an improved performance if at least one "backup" candidate fingerprint image is acquired while a previously acquired candidate fingerprint image is being processed. If the previously acquired candidate fingerprint image turns out to be (likely to be) of insufficient quality to correctly authenticate the user, then the "backup" candidate fingerprint image(s) can be used for an authentication attempt with a higher probability of success.

Through embodiments of the present invention, the user may thus be successfully authenticated even if the first candidate fingerprint image would not be (likely to be) successful for authentication. Hereby, the user inconvenience associated with a false rejection and an instruction to retry or even enter a PIN may at least sometimes be avoided. In other words, the false rejection rate experienced by the user may be considerably reduced, which will increase the satisfaction with the fingerprint authentication system, and with the electronic device comprising the fingerprint authentication system.

In embodiments of the present invention, the processing of the first candidate fingerprint image may be divided into sub-routines, which may be carried out in parallel. This may further reduce the time needed to make an additional authentication attempt based on the second candidate fingerprint image.

According to various embodiments of the present invention, the authentication may additionally be based on the first candidate fingerprint image, i.e. not only on the second candidate fingerprint image. For instance, the authentication may be based on a composite candidate fingerprint image or a representation including information from both the first candidate fingerprint image and the second candidate fingerprint image. Such a composite candidate fingerprint image (or representation) may, for example, be formed by averaging the first and second candidate fingerprint images. Such a procedure may reduce the influence of common mode noise and provide for a more reliable fingerprint authentication. Additional candidate fingerprint images may be acquired, and the authentication may further be based also on such additional candidate fingerprint images.

In embodiments, furthermore, the step of authenticating may comprise the steps of retrieving a stored enrolment representation for the user; processing, by the authentication circuitry, the second candidate fingerprint image to determine an authentication representation based on the second candidate fingerprint image; determining if a match between the authentication representation and the stored enrolment representation fulfills an authentication requirement; and providing, when the match fulfills the authentication requirement, a signal indicating a successful authentication.

The authentication representation may additionally be based on the first candidate fingerprint image, i.e. not only on the second candidate fingerprint image.

In the context of the present application, the "enrolment representation" and/or the "authentication representation" of a fingerprint image may be any information extracted from the fingerprint image, which is useful for assessing the similarity between fingerprint images acquired at different times. For instance, the enrolment/authentication representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

According to various embodiments, the method may further comprise the step of: adjusting at least one setting of the fingerprint sensing arrangement after the step of acquiring the first candidate fingerprint image and before the step of acquiring the second candidate fingerprint image.

For instance, the first candidate fingerprint image may be acquired using default settings, and the at least one setting of the fingerprint sensing arrangement may be adjusted based on at least one property of the first candidate fingerprint image, according to a predetermined scheme or based on any other suitable parameter. This may result in a faster fingerprint authentication procedure and/or in improved reliability of the fingerprint authentication.

According to embodiments, the method may further comprise the steps of: when the processed representation of the first candidate fingerprint image fulfills the at least first evaluation criterion: authenticating the user based on the first candidate fingerprint image.

In embodiment, the step of processing the first candidate fingerprint image may comprise the step of: determining an authentication representation based on the first candidate fingerprint image; and the step of evaluating the processed representation of the first candidate fingerprint image may comprise the steps of: retrieving a stored enrolment representation for the user; and determining if a match between the authentication representation based on the first candidate fingerprint image and the stored enrolment representation fulfills an authentication requirement.

According to a second aspect of the present invention, there is provided a fingerprint authentication system for authenticating a user, comprising: a fingerprint sensing arrangement; a memory; and processing circuitry connected to the fingerprint sensor, and to the memory, the processing circuitry comprising: image acquisition circuitry for: controlling the fingerprint sensing arrangement to acquire a first candidate fingerprint image of a candidate fingerprint to be authenticated; and controlling the fingerprint sensing arrangement to acquire a second candidate fingerprint image of the candidate fingerprint to be authenticated; and authentication circuitry for: processing, while the fingerprint sensing circuitry acquires the second candidate fingerprint image, the first candidate fingerprint image, the processing resulting in a processed representation of the first candidate fingerprint image; evaluating the processed representation of the first candidate fingerprint image in respect of at least a first evaluation criterion; and when the processed representation of the first candidate fingerprint image fails to fulfill the at least one evaluation criterion: authenticating the user based on the second candidate fingerprint image.

The processing circuitry may be provided in the form of one or several processors, which may also control other functions of the electronic device in which the fingerprint authentication system may be comprised. Furthermore, the image acquisition circuitry and the authentication circuitry may be configured to operate in parallel.

Further embodiments of, and effects obtained through this second aspect of the present invention are largely analogous to those described above for the first aspect of the invention.

The fingerprint authentication system according to embodiments of the present invention may be included in an electronic device, further comprising a processing unit configured to control the fingerprint authentication system to carry out a fingerprint authentication of a user, and to perform at least one action only upon successful authentication of the user.

In summary, the present invention relates to a method of authenticating a user by means of a fingerprint authentication system comprising a fingerprint sensing arrangement and authentication circuitry. The method comprises the steps of acquiring a first candidate fingerprint image; acquiring a second candidate fingerprint image; processing, while acquiring the second candidate fingerprint image, the first candidate fingerprint image by the authentication circuitry; and evaluating a result of the processing. When the evaluation indicates that successful authentication is not likely based on the first candidate fingerprint image, the user is authenticated based on the second candidate fingerprint image.

BRIEF DESCRIPTION OF THE DRAWINGS

These and other aspects of the present invention will now be described in more detail, with reference to the appended drawings showing an example embodiment of the invention, wherein:

FIG. 3a is a flow-chart illustrating a fingerprint authentication method according to the prior art;

FIG. 3b is a schematic timing diagram of the prior art fingerprint authentication method in FIG. 3a;

FIG. 4b is a schematic timing diagram illustrating a first variant of the fingerprint authentication method in FIG. 4a;

FIG. 4c is a schematic timing diagram illustrating a second variant of the fingerprint authentication method in FIG. 4a;

FIG. 5b is a schematic timing diagram of the fingerprint authentication method in FIG. 5a;

FIG. 6b is a schematic timing diagram of the fingerprint authentication method in FIG. 6a.

DETAILED DESCRIPTION OF EXAMPLE EMBODIMENTS

Figures 1A, 1B:
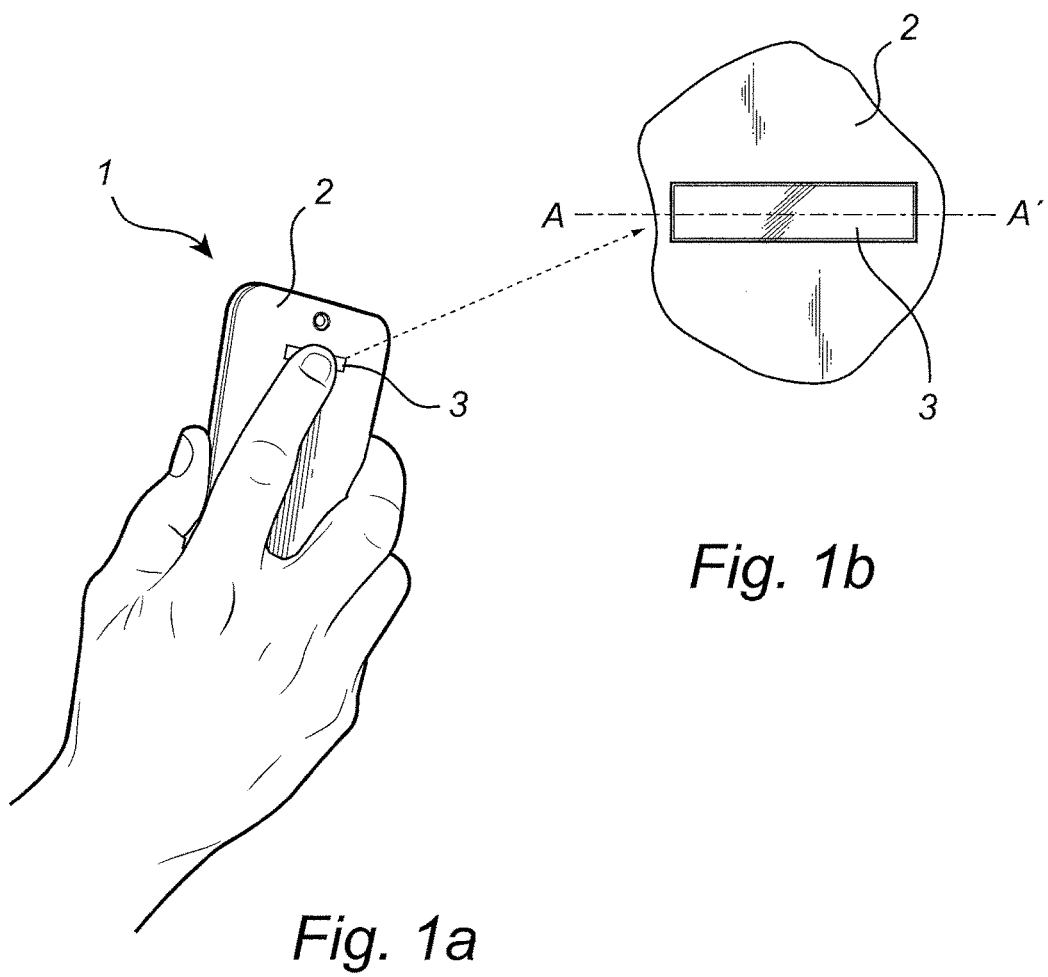
FIGS. 1a-b schematically illustrate an electronic device including a fingerprint sensing device according to an example embodiment of the present invention.

In the present detailed description, various embodiments of the electronic device according to the present invention are mainly discussed with reference to a mobile phone with an elongated fingerprint sensor being accessible through an opening in the back cover. Furthermore, the fingerprint sensor 3 and the processing circuitry are schematically indicated as being different separate components.

It should be noted that this by no means limits the scope of the present invention, which equally well includes, for example, other types of electronic devices, such as smart watches, smart cards, laptop computers etc. Furthermore, the fingerprint sensing device need not be elongated, but could be substantially square. Moreover, the fingerprint sensing device may be arranged in any suitable location in the electronic device, such as being integrated with a button on the front or the side of the mobile phone, or arranged under a cover glass etc. In addition, the processing circuitry, or parts of the processing circuitry, may be integrated with the fingerprint sensor. For instance, the image acquisition circuitry 11 and the image processing circuitry 12 may be integrated in the fingerprint sensor component 3 together with the sensor array 10. The authentication processing circuitry 13 may also be integrated in the fingerprint sensor component 3.

FIG. 1a schematically illustrates an example embodiment of the electronic device according to the present invention, in the form of a mobile phone 1 having a housing 2 and an integrated fingerprint sensor 3 being accessible through an opening in the housing 2. The fingerprint sensor 3 may, for example, be used for unlocking the mobile phone 1 and/or for authorizing transactions carried out using the mobile phone etc.

FIG. 1b is an enlarged view of the fingerprint sensor 3 and its integration with the housing 2.

Figure 2:
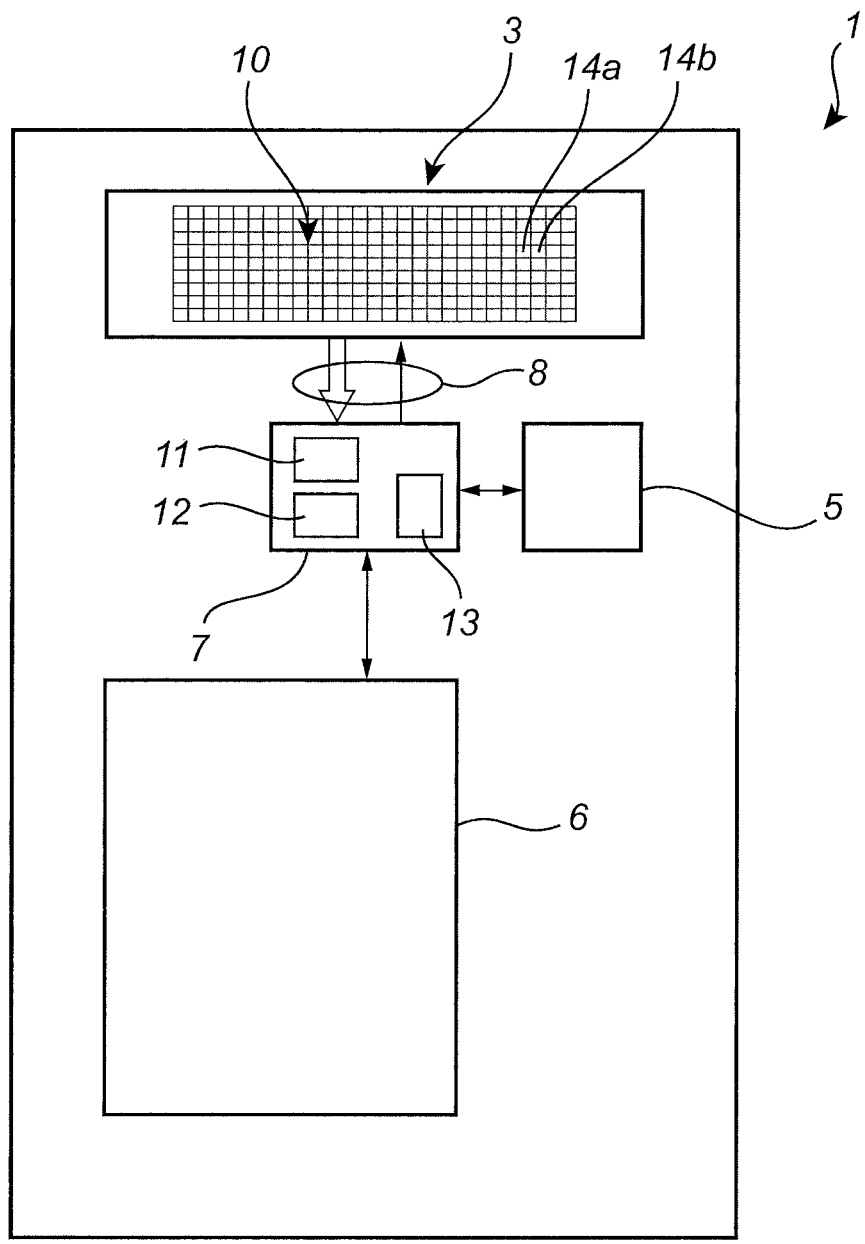
FIG. 2 is a block diagram of the electronic device in FIGS. 1a-b.

With reference to FIG. 2, which is a schematic block-diagram of the mobile phone is FIG. 1a, the mobile phone 1, in addition to the above-mentioned fingerprint sensor 3, comprises communication circuitry 5, user interface circuitry 6, processing circuitry 7, and a fingerprint sensor interface 8, here schematically indicated by the line arrows indicating control signals and the block arrow indicating data transfer.

As is schematically indicated in FIG. 2, the fingerprint sensor 3 comprises a sensor array 10 including a plurality of sensing elements 14a-b (only two neighboring sensing elements are indicated with reference numerals in FIG. 2 to avoid cluttering the drawing). Although not shown in FIG. 2, the fingerprint sensing device 3 additionally comprises readout circuitry for converting sensing signals from the sensing elements to provide a representation of a fingerprint (or the surface structure of another object) touching the sensor surface.

The processing circuitry 7 comprises image acquisition circuitry 11, image processing circuitry 12 and authentication processing circuitry 13. The image acquisition circuitry 11 controls the fingerprint sensor 3 to acquire images, the image processing circuitry 12 performs various image processing on the acquired images to produce processed images, and the authentication processing circuitry 13 performs fingerprint authentication based on the processed images from the image processing circuitry 12. The processing circuitry 7 may advantageously comprise several cores or CPU:s, so that the processing circuitry 7 is capable of parallel processing.

The above-mentioned communication circuitry 5 may, for example, comprise one or several of various antennas and control units for wireless communication, and the above-mentioned user interface circuitry 6 may, for example, comprise one or several of a display, a microphone, a speaker, and a vibration unit.

For a clear understanding of benefits obtained through embodiments of the present invention, a fingerprint authentication method according to the prior art will first be described with reference to FIGS. 3a-b.

In a first step 100, a first candidate fingerprint image is acquired. In the subsequent step 101, the first candidate fingerprint image is processed for authentication. Typically, this step 101 involves retrieving an enrolment representation of a stored fingerprint of the user, forming an authentication representation based on the first candidate fingerprint image, and comparing the authentication representation with the enrolment representation.

In step 102, it is determined if there is a match between the authentication representation and the enrolment representation. If it is determined in step 102 that there is a match, then the method proceeds to step 103 where it is indicated that the authentication succeeded.

If it is determined in step 102 that there is no match, the method proceeds to step 104, where the user is instructed, via the user interface circuitry 6, to try again. This involves removing the finger from the sensor, and placing the finger on the sensor again.

When the finger has once more been placed on the fingerprint sensor 3, a second candidate fingerprint image is acquired in step 105. In the subsequent step 106, the second candidate fingerprint image is processed for authentication as described above, and in step 107, it is determined if there is a match between the authentication representation based on the second candidate fingerprint image and the enrolment representation. If it is determined in step 107 that there is a match, then the method proceeds to step 108 where it is indicated that the authentication succeeded.

If it is determined in step 107 that there is no match, the method proceeds to step 109, where the user is instructed, via the user interface circuitry 6, to enter his/her PIN. This may be annoying to the user and may reduce the willingness of the user to use the fingerprint authentication system of the electronic device.

It should be understood that this method is simplified to allow the description to focus on what is relevant for embodiments of the present invention. In most existing systems, for instance, more than two failed fingerprint authentication attempts are allowed before the user is prompted to enter his/her PIN.

If the first fingerprint authentication attempt detailed above is successful, the authentication is likely to be perceived as fast, and the electronic device as responsive. If, however, the first authentication attempt fails and the second authentication attempts succeeds, the total time needed for fingerprint authentication will be considerably longer, as an additional user action is required (lifting the finger from the fingerprint sensor and then placing the finger on the fingerprint sensor again).

This is schematically illustrated, for the prior art fingerprint authentication method described above, in the schematic timing diagram in FIG. 3b.

Figure 3B:
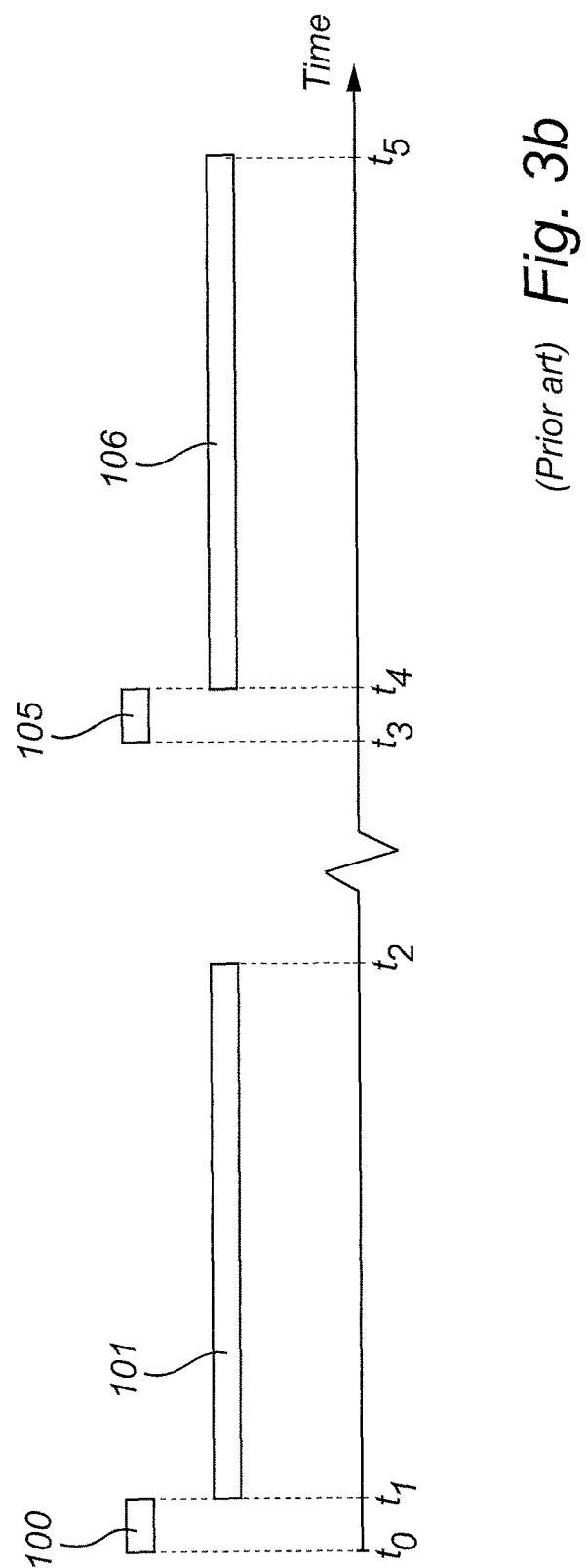

Referring to the timing diagram in FIG. 3b, the acquisition of the first candidate fingerprint image (step 100) starts at an initial time $t_0$, and ends at a first time $t_1$. At the first time $t_1$, when the acquisition of the first candidate fingerprint image is completed, the authentication processing (step 101) of the first candidate fingerprint image starts. The authentication processing ends at a second time $t_2$. Assuming that the authentication result is negative, the user is prompted to lift his/her finger from the sensor and then place his/her finger on the sensor again. This procedure takes so much time, as compared to the time needed for image acquisition or authentication processing, that a portion of the time line has been removed as indicated in FIG. 3b.

At a third time $t_3$, when the user has placed his/her finger on the sensor again, a second candidate fingerprint image is acquired (step 105), and at a fourth time $t_4$, the authentication processing (step 106) of the second candidate fingerprint image starts. When the authentication processing is completed, at a fifth time $t_5$, it is assumed that authentication succeeded.

With a failed first authentication attempt and a successful second authentication attempt, the fingerprint authentication procedure according to the prior art thus requires the time period between the initial time $t_0$ and the fifth time $t_5$. This time may be as high as two seconds or more, mainly depending on the time needed for the user to note that the first authentication attempt failed, lift the finger and place the finger on the sensor again.

Figure 4A:
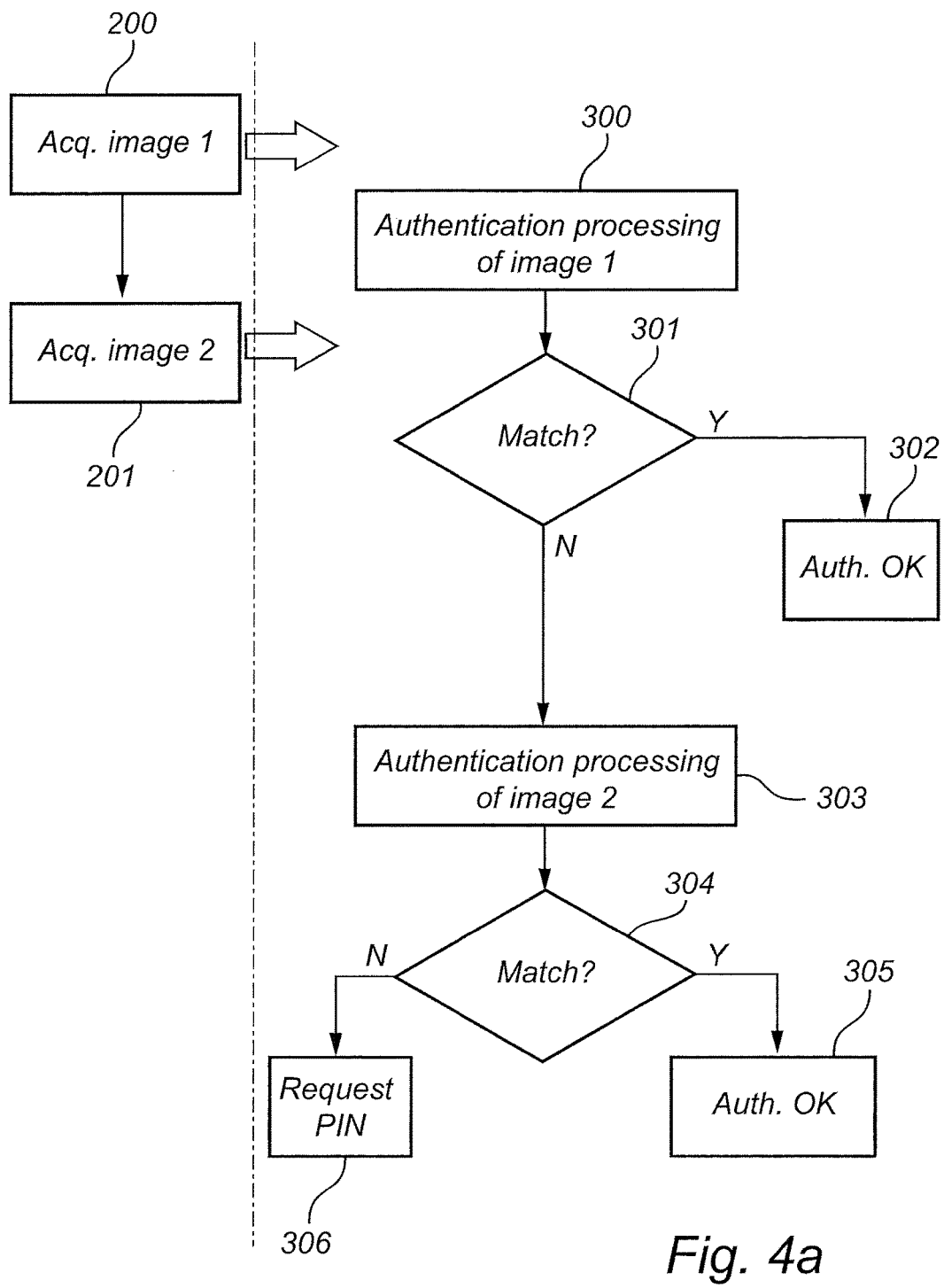
FIG. 4a is a flow-chart illustrating a fingerprint authentication method according to a first embodiment of the present invention.

With reference to FIGS. 4a-c, and to FIG. 2, a fingerprint authentication method according to a first embodiment of the present invention will now be described.

Referring first to FIG. 4a, the fingerprint authentication method is carried out in parallel sub-processes by the image acquisition circuitry 11 in FIG. 2 and authentication processing circuitry embodied by the image processing circuitry 12 and the authentication processing circuitry 13 in FIG. 2.

Thus, in the image acquisition sub-process, the image acquisition circuitry 11 acquires a first candidate fingerprint image in a first step 200, and thereafter acquires a second candidate fingerprint image in a second step 201.

As is schematically indicated by block arrows in the flow-chart in FIG. 4a, the image acquisition circuitry 11 provides the acquired candidate fingerprint images to the authentication processing circuitry. Depending on the exact timing of the image acquisitions, the candidate fingerprint images (at least the second candidate fingerprint image) may be stored in a memory (not shown in FIG. 2) until the authentication processing circuitry is ready to start processing the candidate fingerprint image.

In the authentication sub-process, the authentication processing circuitry performs authentication processing on the first candidate fingerprint image in step 300. As described above, the authentication processing may involve retrieving an enrolment representation, as well as image processing and determination of a first authentication representation based on the first candidate fingerprint image. As is well known to one of ordinary skill in the art, the image processing may, for instance, comprise image enhancement, and rotation and translation correction etc.

The authentication representation is compared to the enrolment representation, and it is determined, in the subsequent step 301, if there is a match between the authentication representation and the enrolment representation.

If it is determined in step 301 that there is a match, then the method proceeds to step 302 where it is indicated that the authentication succeeded.

If it is determined in step 301 that there is no match, the method proceeds to step 303, where the authentication processing circuitry performs authentication processing on the second candidate fingerprint image (or on a combination of the first and second candidate fingerprint image).

In the next step 304, it is determined if there is a match between the authentication representation based on the second candidate fingerprint image and the enrolment representation.

If it is determined in step 304 that there is a match, then the method proceeds to step 305 where it is indicated that the authentication succeeded.

If it is determined in step 304 that there was no match, the method proceeds to step 306, where the user is instructed, via the user interface circuitry 6, to enter his/her PIN.

It should be understood that this method is simplified to allow the description to focus on what is relevant for embodiments of the present invention. As an alternative to requesting the user to enter his/her PIN, additional candidate fingerprint image may be acquired and processed as described above. Further, the user may be instructed to lift his/her finger and again place it on the sensor to perform the method described above at least one more time before requiring a PIN-entry.

The parallel procedure for fingerprint authentication detailed above provides for faster fingerprint authentication. It also provides for an improved reliability of the fingerprint authentication system, as perceived by the user of the fingerprint authentication system.

This is illustrated, for a first variant of the method described above with reference to the flow-chart in FIG. 4a, in the schematic timing diagram in FIG. 4b.

Like in the timing diagram in FIG. 3b, the acquisition of the first candidate fingerprint image (step 200) starts at the initial time $t_0$, and ends at the first time $t_1$. At the first time $t_1$, when the acquisition of the first candidate fingerprint image is completed, the authentication processing (step 300) of the first candidate fingerprint image starts. During the authentication processing of the first candidate fingerprint image, the acquisition of the second candidate fingerprint image (step 201) takes place. In the schematic timing diagram of FIG. 4b, it is indicated that the acquisition of the second candidate fingerprint image starts at a seventh time $t_7$. The time period from the first time $t_1$ to the seventh time $t_7$ may be controlled as desired. In embodiments, it may be desirable to wait a minimum time period before starting the acquisition of the second candidate fingerprint image for an increased probability that the finger has settled on the fingerprint sensor 3. In other embodiments, a sequence of new candidate fingerprint image may be acquired as soon as possible after acquisition of the first candidate fingerprint image to provide as much image information as possible to the authentication processing.

The authentication processing of the first candidate fingerprint image ends at the second time $t_2$. Assuming that the authentication result is negative, the authentication processing of the second candidate fingerprint image (step 303) immediately starts. When the authentication processing is completed, at an eighth time $t_8$, it is assumed that authentication succeeded.

With a failed first authentication attempt and a successful second authentication attempt, the fingerprint authentication procedure according to the first exemplary embodiment of the present invention thus requires the time period between the initial time $t_0$ and the eighth time $t_8$. This time may be significantly shorter than the time required for the prior art method described further above with reference to FIGS. 3a-b. If, for instance, the image acquisition takes around 10 milliseconds, and the authentication processing to arrive at an authentication result takes around 200 milliseconds, then the total time period between the initial time $t_0$ and the eighth time $t_8$ becomes around 0.4 seconds. With the development of faster authentication processing techniques and/or deployment of faster processors, this time will obviously be further reduced.

Since the penalty, in terms of time, for an authentication retry is relatively small, it may be beneficial to reduce the time for the image acquisition at least of the first candidate fingerprint image. For instance, less time may be spent on ensuring that the finger is stable on the fingerprint sensor and that a sufficient portion of the fingerprint sensor surface is covered by the finger. This may reduce the authentication success rate for the first authentication processing step (step 300), but may result in a shorter average time from finger placement to a successful authentication.

To further improve the performance of the fingerprint authentication system in terms of speed and perceived authentication success rate, the acquisition of the first candidate fingerprint image (step 200) may be optimized for speed, and the acquisition of the second candidate fingerprint image (step 201) may be optimized for image quality.

In order to minimize the time for acquisition of the first candidate fingerprint image, the first candidate fingerprint image may, for instance, be acquired using a predefined set of sensing arrangement settings, which may not be optimized for the electrical properties of the finger that is currently placed on the sensor.

To maximize the quality of the second candidate fingerprint image, the acquisition of the second candidate fingerprint image may be allowed to take practically all of the available time when the authentication processing circuitry is busy and not able to perform authentication processing on a new candidate fingerprint image. This time may be utilized to improve the quality of the second candidate fingerprint image in various ways. For instance, several images may be captured and combined to form the second candidate fingerprint image.

A second variant of the method described above with reference to the flow-chart in FIG. 4a, will now be described with reference to the schematic timing diagram in FIG. 4c. In this second variant, the acquisition of the first candidate fingerprint image (step 200) is optimized for speed, and the acquisition of the second candidate fingerprint image (step 201) is optimized for image quality.

The second variant of the first embodiment of the method according to the present invention differs from the first variant schematically shown in FIG. 4b in that the acquisition of the second candidate fingerprint image (step 201) is allowed to continue practically until the authentication processing of the first candidate fingerprint image (step 300) is completed. In this variant (and in other embodiments and variants), the seventh time $t_7$, when the acquisition of the second candidate fingerprint image is started, may be selected to be as close as possible to the first time $t_1$, when the acquisition of the first candidate fingerprint image is completed.

Thanks to the additional time used for the acquisition of the second candidate fingerprint image, the image quality of the second candidate fingerprint image can be improved, which in turn increases the chance of a successful authentication of a legitimate user.

In the following, further embodiments of the present invention will be described with reference to FIGS. 5a-b and FIGS. 6a-b. It should be understood that the considerations described above in connection with FIG. 4c can equally well be applied to the embodiment described below, and to other embodiments of the present invention.

Figure 5A:
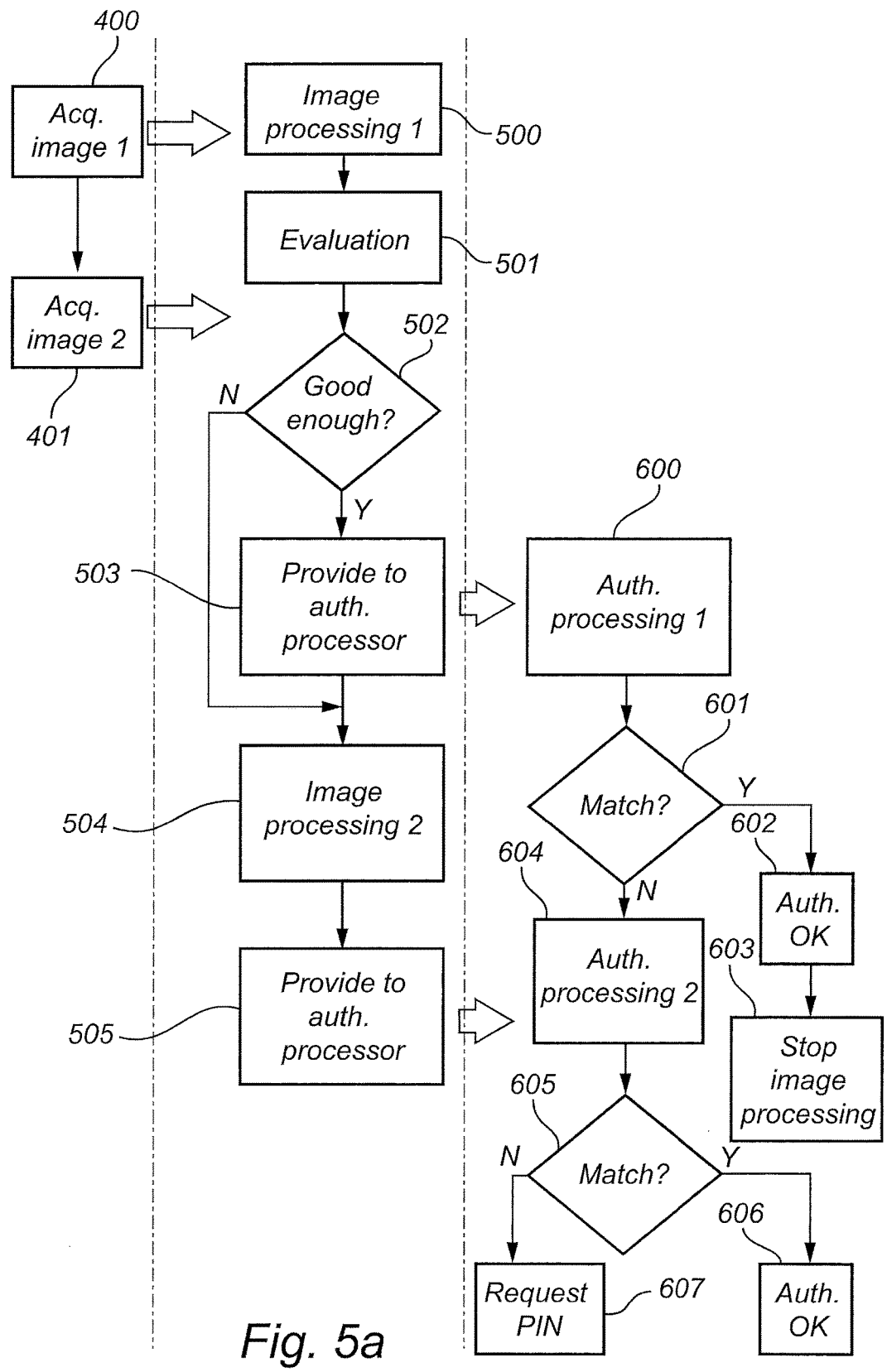
FIG. 5a is a flow-chart illustrating a fingerprint authentication method according to a second embodiment of the present invention.

With reference to FIGS. 5a-b, and to FIG. 2, a fingerprint authentication method according to a second embodiment of the present invention will now be described.

Referring first to FIG. 5a, the fingerprint authentication method is carried out in three parallel sub-processes by the image acquisition circuitry 11, the image processing circuitry 12, and the authentication processing circuitry 13 in FIG. 2, respectively.

Thus, in the image acquisition sub-process, the image acquisition circuitry 11 acquires a first candidate fingerprint image in a first step 400, and thereafter acquires a second candidate fingerprint image in a second step 401.

As is schematically indicated by block arrows in the flow-chart in FIG. 5a, the image acquisition circuitry 11 provides the acquired candidate fingerprint images to the image processing circuitry 12. Depending on the exact timing of the image acquisitions, the candidate fingerprint images (at least the second candidate fingerprint image) may be stored in a memory (not shown in FIG. 2) until the image processing circuitry 12 is ready to start processing the candidate fingerprint image.

In the image processing sub-process, the image processing circuitry 12 performs image processing on the first candidate fingerprint image in step 500. As is well known to one of ordinary skill in the art, the image processing may, for instance, comprise image enhancement, and rotation and translation correction etc.

In the next step 501 in the image processing sub-process, the processed first candidate fingerprint image is evaluated with respect to an image quality criterion. In this evaluation step 501, it may, for instance be evaluated if a histogram of the first candidate fingerprint image indicate sufficiently separated peaks representing fingerprint ridges and valleys.

In the subsequent step 502, it is determined if the first candidate fingerprint image is of sufficient quality to be likely to be useful for authentication processing.

If it is determined in step 502 that this is the case, then the sub-process proceeds to step 503 and provides the image processed version of the first candidate fingerprint image to the authentication processing circuitry 13. Thereafter, the image processing sub-process proceeds to step 504 and performs image processing on the second candidate fingerprint image. This image processing may advantageously include processing also the first candidate fingerprint image. For instance, the first candidate fingerprint image and the second candidate fingerprint image may be averaged and further image processing may be performed on averaged image data. When the second image processing step 504 is finalized, the processed image is provided to the authentication processing circuitry in step 505.

If it is instead determined in step 502 that the first candidate fingerprint image is not of sufficient quality to be likely to be useful for authentication processing, then the sub-process directly proceeds to the second image processing step 504 and then continues as described above. Accordingly, in this case, the processed first candidate fingerprint image is not provided to the authentication processing circuitry 13.

Turning now to the authentication sub-process carried out by the authentication processing circuitry 13 in FIG. 2, a first authentication processing of the pre-processed first candidate fingerprint image is carried out in a first step 600 (if such a pre-processed first candidate fingerprint image is provided by the image processing circuitry 12).

As described above, the authentication processing may involve retrieving an enrolment representation, and determination of a first authentication representation based on the processed candidate fingerprint image received from the image processing circuitry 12.

The authentication representation is compared to the enrolment representation, and it is determined, in the subsequent step 601, if there is a match between the authentication representation and the enrolment representation.

If it is determined in step 601 that there is a match, then the method proceeds to step 602 where it is indicated that the authentication succeeded, and then a stop command is sent to the image processing sub-routine in step 603.

If it is determined in step 601 that there is no match, the method proceeds to step 604, where the authentication processing circuitry 13 performs authentication processing on the second candidate fingerprint image (or on a combination of the first and second candidate fingerprint image).

In the next step 605, it is determined if there is a match between the authentication representation based on the second candidate fingerprint image and the enrolment representation.

If it is determined in step 605 that there is a match, then the method proceeds to step 606 where it is indicated that the authentication succeeded.

If it is determined in step 605 that there is no match, the method proceeds to step 607, where the user is instructed, via the user interface circuitry 6, to enter his/her PIN.

It should be understood that this method is simplified to allow the description to focus on what is relevant for embodiments of the present invention. As an alternative to requesting the user to enter his/her PIN, additional candidate fingerprint image may be acquired and processed as described above. Further, the user may be instructed to lift his/her finger and again place it on the sensor to perform the method described above at least one more time before requiring a PIN-entry.

The parallel procedure for fingerprint authentication detailed above provides for faster fingerprint authentication. It also provides for an improved reliability of the fingerprint authentication system, as perceived by the user of the fingerprint authentication system.

This is schematically illustrated in the schematic timing diagram in FIG. 5b.

Like in the timing diagram in FIG. 4b, the acquisition of the first candidate fingerprint image (step 400) starts at the initial time $t_0$, and ends at the first time $t_1$. At the first time $t_1$, when the acquisition of the first candidate fingerprint image is completed, the image processing (step 500) of the first candidate fingerprint image starts. During the image processing of the first candidate fingerprint image, the acquisition of the second candidate fingerprint image (step 401) takes place. In the schematic timing diagram of FIG. 5b, it is indicated that the acquisition of the second candidate fingerprint image starts at the seventh time $t_7$. As for the first embodiment described above, the time period from the first time $t_1$ to the seventh time $t_7$ may be controlled as desired.

The image processing of the first candidate fingerprint image ends at a tenth time $t_{10}$, and at this time, the first authentication processing (step 600) starts. As is also indicated in FIG. 5b, the image processing of the second candidate fingerprint image (step 504) also starts at the tenth time $t_{10}$. As before, the first authentication processing is assumed to be completed at the second time $t_2$. In case the first authentication fails, a second authentication processing (step 604) starts at the second time $t_2$ and continues until an eleventh time $t_{11}$.

When the second authentication processing is completed, at the eleventh time $t_{11}$, it is assumed that authentication succeeded.

With a failed first authentication attempt and a successful second authentication attempt, the fingerprint authentication procedure according to the second exemplary embodiment of the present invention thus requires the time period between the initial time $t_0$ and the eleventh time $t_{11}$. This time period may be even shorter than the time period required for the fingerprint authentication procedure according to the first embodiment of the present invention described further above with reference to FIGS. 4a-b. If, for instance, the image acquisition takes around 10 milliseconds, the image processing takes about 80 milliseconds, and the authentication processing to arrive at an authentication result based on a processed image takes around 120 milliseconds, then the total time period between the initial time $t_0$ and the eleventh time $t_{11}$ becomes around 0.3 seconds. With the development of faster authentication processing techniques and/or deployment of faster processors, this time will obviously be further reduced.

In addition, further parallelization of the authentication processing (including image pre-processing and forming an authentication processing) can also reduce the time for a successful authentication.

One example of a fingerprint authentication method according to a third embodiment of the present invention, where such further parallelization is used, will now be described with reference to FIGS. 6a-b.

Figure 6A:
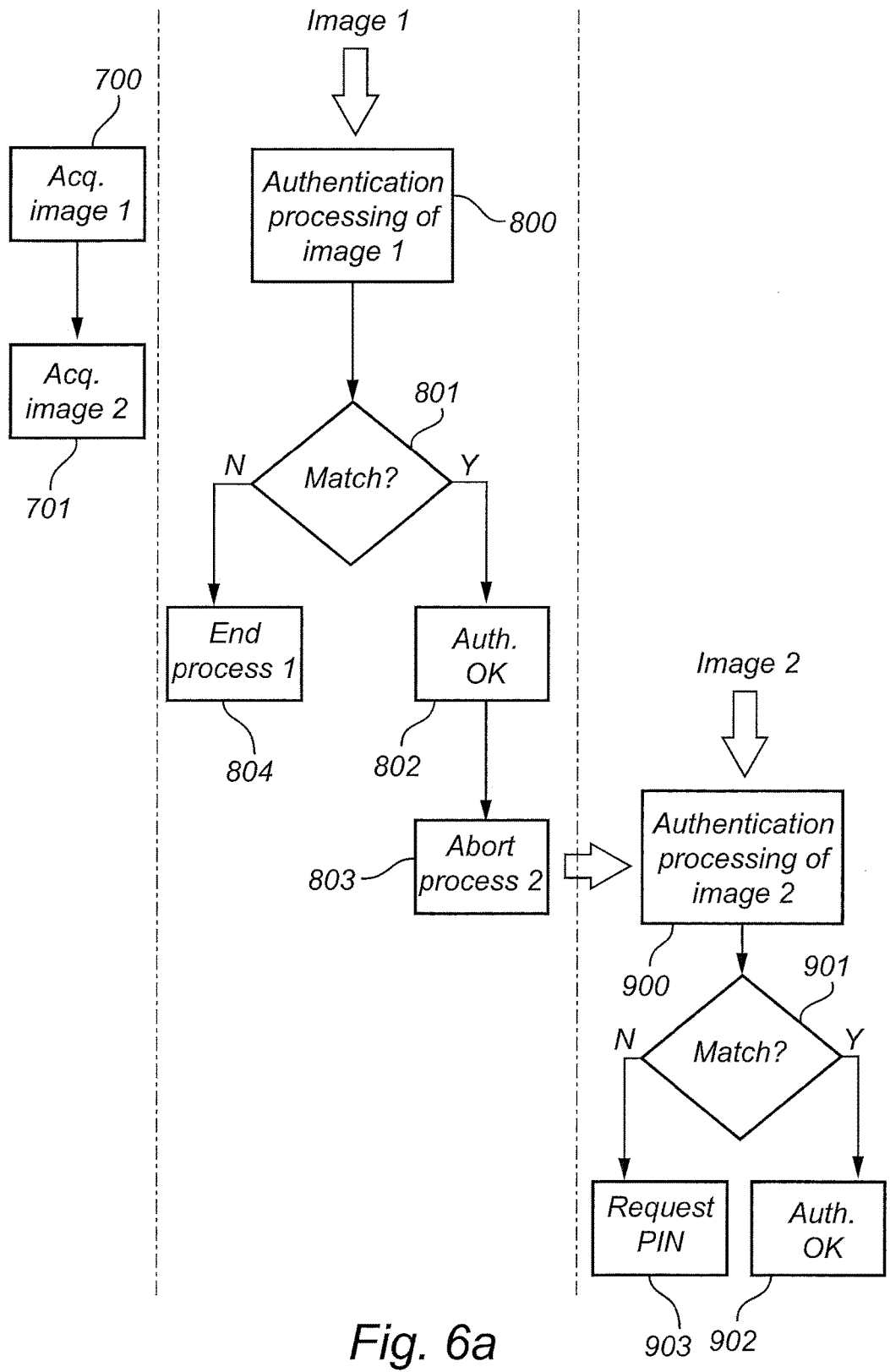
FIG. 6a is a flow-chart illustrating a fingerprint authentication method according to a third embodiment of the present invention.

Referring first to FIG. 6a, the third embodiment of the fingerprint authentication method basically differs from the first embodiment described further above with reference to FIGS. 4a-b in that the authentication processing of the first candidate fingerprint image and the second candidate fingerprint image is carried out in parallel, rather than in sequence.

In the image acquisition sub-process, the image acquisition circuitry 11 acquires a first candidate fingerprint image in a first step 700, and thereafter acquires a second candidate fingerprint image in a second step 701.

The image acquisition circuitry 11 provides the acquired candidate fingerprint images to the authentication processing circuitry. Depending on the exact timing of the image acquisitions, one or both of the candidate fingerprint images may be stored in a memory (not shown in FIG. 2) until the authentication processing circuitry is ready to start processing the candidate fingerprint image(s).

In the first authentication sub-process, the authentication processing circuitry performs authentication processing on the first candidate fingerprint image in step 800. As described above, the authentication processing may involve retrieving an enrolment representation, as well as image processing and determination of a first authentication representation based on the first candidate fingerprint image. As is well known to one of ordinary skill in the art, the image processing may, for instance, comprise image enhancement, and rotation and translation correction etc.

The authentication representation is compared to the enrolment representation, and it is determined, in the subsequent step 801, if there is a match between the authentication representation and the enrolment representation.

If it is determined in step 801 that there is a match, then the method proceeds to step 802 where it is indicated that the authentication succeeded, and to step 803 where the parallel authentication processing of the second candidate fingerprint image (which is described below) is aborted.

If it is determined in step 801 that there is no match, the method proceeds to step 804, and ends the first authentication sub-process.

In the second authentication sub-process, the authentication processing circuitry performs authentication processing on the second candidate fingerprint image in step 900. As described above, the authentication processing may involve retrieving an enrolment representation, as well as image processing and determination of a first authentication representation based on the first candidate fingerprint image. As is well known to one of ordinary skill in the art, the image processing may, for instance, comprise image enhancement, and rotation and translation correction etc.

The authentication representation is compared to the enrolment representation, and it is determined, in the subsequent step 901, if there is a match between the authentication representation and the enrolment representation.

If it is determined in step 901 that there is a match, then the method proceeds to step 902 where it is indicated that the authentication succeeded.

If it is determined in step 901 that there is no match, the method proceeds to step 903, where the user is instructed, via the user interface circuitry 6, to enter his/her PIN.

It should be understood that this method is simplified to allow the description to focus on what is relevant for embodiments of the present invention. As an alternative to requesting the user to enter his/her PIN, additional candidate fingerprint image may be acquired and processed as described above. Further, the user may be instructed to lift his/her finger and again place it on the sensor to perform the method described above at least one more time before requiring a PIN-entry.

The extended parallelization of the fingerprint authentication method according to the third embodiment detailed above provides for even faster fingerprint authentication. It also provides for a further improved responsiveness of the fingerprint authentication system, as perceived by the user of the fingerprint authentication system.

This is illustrated in the schematic timing diagram in FIG. 6b.

Like in the timing diagram in FIG. 3b, the acquisition of the first candidate fingerprint image (step 700) starts at the initial time $t_0$, and ends at the first time $t_1$. At the first time $t_1$, when the acquisition of the first candidate fingerprint image is completed, the authentication processing (step 800) of the first candidate fingerprint image starts. During the authentication processing of the first candidate fingerprint image, the acquisition of the second candidate fingerprint image (step 701) takes place. In the schematic timing diagram of FIG. 6b, it is indicated that the acquisition of the second candidate fingerprint image starts at a seventh time $t_7$. The time period from the first time $t_1$ to the seventh time $t_7$ may be controlled as desired. In embodiments, it may be desirable to wait a minimum time period before starting the acquisition of the second candidate fingerprint image for an increased probability that the finger has settled on the fingerprint sensor 3. In other embodiments, a sequence of new candidate fingerprint image may be acquired as soon as possible after acquisition of the first candidate fingerprint image to provide as much image information as possible to the authentication processing.

The acquisition of the second candidate fingerprint image is completed at a thirteenth time $t_{13}$. At this time, the authentication processing (step 900) of the second candidate fingerprint image starts, and runs in parallel with the authentication processing (step 800) of the first candidate fingerprint image.

The authentication processing of the first candidate fingerprint image ends at the second time $t_2$. If the authentication result based on the first candidate fingerprint image is positive, then the second authentication process (step 900) is not needed and can be aborted. In FIG. 6b it is, for illustrative purposes, assumed that the authentication result of the first authentication processing (step 800) is negative.

When the second authentication process (step 900) is completed, at a fourteenth time $t_{14}$, it is assumed that authentication succeeded.

With a failed first authentication attempt and a successful second authentication attempt, the fingerprint authentication procedure according to the third exemplary embodiment of the present invention thus requires the time period between the initial time $t_0$ and the fourteenth time $t_{14}$. Due to the extended parallelization of the third embodiment, this time period may be even shorter than the time required for the fingerprint authentication method according to the first embodiment described further above with reference to FIGS. 4a-b.

Based on the three exemplary embodiments of the present invention described herein, it will be straight-forward for one of ordinary skill in the art to consider additional embodiments and variations. For instance, the parallelization of the fingerprint authentication method according to the second embodiment described further above with reference to FIGS. 5a-b may also be extended. For example, one or both of the image processing (steps 500 to 505) and the authentication processing (steps 600 to 607) may be parallelized as described above with reference to FIGS. 6a-b.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of authenticating a user by means of a fingerprint authentication system comprising a fingerprint sensing arrangement and authentication circuitry, said method comprising the steps of:
   acquiring, by said fingerprint sensing arrangement, a first candidate fingerprint image of a finger of said user during a finger placement event when said finger is not moving across a surface of said fingerprint sensing arrangement;
   acquiring, by said fingerprint sensing arrangement, a second candidate fingerprint image during said finger placement event; adjusting at least one setting of said fingerprint sensing arrangement after the step of acquiring said first candidate fingerprint image and before the step of acquiring said second candidate fingerprint image;
   processing, while acquiring said second candidate fingerprint image, said first candidate fingerprint image by said authentication circuitry, said processing resulting in a processed representation of the first candidate fingerprint image;
   evaluating said processed representation of the first candidate fingerprint image in respect of at least a first evaluation criterion; and
   when said processed representation of the first candidate fingerprint image fails to fulfill said at least one evaluation criterion:
   authenticating said user based on said second candidate fingerprint image.

2. The method according to claim 1, wherein said authentication is additionally based on said first candidate fingerprint image.

3. The method according to claim 1, wherein said step of authenticating comprises the steps of:
   retrieving a stored enrolment representation for said user;
   processing, by said authentication circuitry, said second candidate fingerprint image to determine an authentication representation based on said second candidate fingerprint image;
   determining if a match between said authentication representation and said stored enrolment representation fulfills an authentication requirement; and
   providing, when said match fulfills said authentication requirement, a signal indicating a successful authentication.

4. The method according to claim 3, wherein said authentication representation is additionally based on said first candidate fingerprint image.

5. The method according to claim 1, wherein said method further comprises the steps of:
   when said processed representation of the first candidate fingerprint image fulfills said at least first evaluation criterion:
   authenticating said user based on said first candidate fingerprint image.

6. The method according to claim 1, wherein:
   the step of processing said first candidate fingerprint image comprises the step of:
   determining an authentication representation based on said first candidate fingerprint image; and
   the step of evaluating said processed representation of the first candidate fingerprint image comprises the steps of:
   retrieving a stored enrolment representation for said user; and
   determining if a match between said authentication representation based on said first candidate fingerprint image and said stored enrolment representation fulfills an authentication requirement.

7. The method according to claim 1, wherein said first evaluation criterion is based on said second candidate fingerprint image.

8. A fingerprint authentication system for authenticating a user, comprising:
   a fingerprint sensing arrangement for receiving a finger of said user on a surface thereof;
   a memory; and
   processing circuitry connected to said fingerprint sensor, and to said memory, said processing circuitry comprising:
   image acquisition circuitry for:
      controlling said fingerprint sensing arrangement to acquire a first candidate fingerprint image of a candidate fingerprint to be authenticated during a finger placement event when said finger is not moving across the surface of said fingerprint sensing arrangement; adjusting at least one setting of said fingerprint sensing arrangement after the step of acquiring said first candidate fingerprint image and before the step of acquiring said second candidate fingerprint image; adjusting at least one setting of said fingerprint sensing arrangement after the step of acquiring said first candidate fingerprint image and before the step of acquiring said second candidate fingerprint image; and
      controlling said fingerprint sensing arrangement to acquire a second candidate fingerprint image of said candidate fingerprint to be authenticated during said finger placement event; and
   authentication circuitry for:
      processing, while said fingerprint sensing circuitry acquires said second candidate fingerprint image, said first candidate fingerprint image, said processing resulting in a processed representation of the first candidate fingerprint image;
      evaluating said processed representation of the first candidate fingerprint image in respect of at least a first evaluation criterion; and when said processed representation of the first candidate fingerprint image fails to fulfill said at least one evaluation criterion:
authenticating said user based on said second candidate fingerprint image.

9. The fingerprint authentication system according to claim 8, wherein said authentication is additionally based on said first candidate fingerprint image.

10. The fingerprint authentication system according to claim 8, wherein said authenticating circuitry is configured to authenticate said user by:
retrieving a stored enrolment representation for said user from said memory;
processing said second candidate fingerprint image to determine an authentication representation based on said second candidate fingerprint image;
determining if a match between said authentication representation and said stored enrolment representation fulfills an authentication requirement; and
providing, when said match fulfills said authentication requirement, a signal indicating a successful authentication.

11. An electronic device comprising;
a fingerprint authentication system according to claim 8; and
a processing unit configured to control said fingerprint authentication system to carry out a fingerprint authentication of a user, and to perform at least one action only upon successful authentication of said user.

* * * * *